United States Patent
Akada et al.

(10) Patent No.: US 11,459,644 B2
(45) Date of Patent: Oct. 4, 2022

(54) COPPER-COATED STEEL WIRE AND CANTED COIL SPRING

(71) Applicant: SUMITOMO ELECTRIC INDUSTRIES, LTD., Osaka (JP)

(72) Inventors: Takumi Akada, Osaka (JP); Hiromu Izumida, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 136 days.

(21) Appl. No.: 16/965,420

(22) PCT Filed: Oct. 22, 2018

(86) PCT No.: PCT/JP2018/039192
§ 371 (c)(1),
(2) Date: Jul. 28, 2020

(87) PCT Pub. No.: WO2019/150667
PCT Pub. Date: Aug. 8, 2019

(65) Prior Publication Data
US 2021/0079505 A1    Mar. 18, 2021

(30) Foreign Application Priority Data
Feb. 1, 2018    (JP) .............................. JP2018-016440

(51) Int. Cl.
*C22C 38/04*    (2006.01)
*C22C 38/00*    (2006.01)
(Continued)

(52) U.S. Cl.
CPC ............ *C22C 38/04* (2013.01); *C22C 38/002* (2013.01); *C22C 38/02* (2013.01); *F16F 1/021* (2013.01);
(Continued)

(58) Field of Classification Search
CPC ........ C22C 38/04; C22C 38/002; C22C 38/02; F16F 1/021; F16F 1/024; F16F 1/045; F16F 2224/0208
(Continued)

(56) References Cited

U.S. PATENT DOCUMENTS

| | | |
|---|---|---|
| 5,240,520 A | 8/1993 | Tarui et al. |
| 6,372,056 B1 | 4/2002 | Kuroda et al. |

(Continued)

FOREIGN PATENT DOCUMENTS

| | | |
|---|---|---|
| JP | H04-187335 | 7/1992 |
| JP | H06-158353 | 6/1994 |

(Continued)

OTHER PUBLICATIONS

Office Action dated Dec. 6, 2021 with respect to the related U.S. Appl. No. 16/616,360.

(Continued)

*Primary Examiner* — Humera N. Sheikh
*Assistant Examiner* — Katherine A Christy
(74) *Attorney, Agent, or Firm* — IPUSA, PLLC (57) ABSTRACT

A copper-coated steel wire includes: a core wire made of steel having a pearlite structure; and a coating layer covering a surface of the core wire and made of Cu or a Cu alloy. The steel contains C by greater than or equal to 0.5% by mass and less than or equal to 1.0% by mass, Si by greater than or equal to 0.1% by mass and less than or equal to 2.5% by mass, Mn by greater than or equal to 0.3% by mass and less than or equal to 0.9% by mass, and the balance consisting of Fe and inevitable impurities. In a cross section perpendicular to a longitudinal direction, a value of surface roughness Ra of the core wire is greater than or equal to 25% and less than or equal to 70% of a thickness of the coating layer.

13 Claims, 6 Drawing Sheets

(51) Int. Cl.
    *C22C 38/02*     (2006.01)
    *F16F 1/02*     (2006.01)
    *F16F 1/04*     (2006.01)

(52) U.S. Cl.
    CPC .............. *F16F 1/024* (2013.01); *F16F 1/045* (2013.01); *F16F 2224/0208* (2013.01)

(58) Field of Classification Search
    USPC ........................................................ 428/592
    See application file for complete search history.

(56) References Cited

U.S. PATENT DOCUMENTS

| | | |
|---|---|---|
| 11,186,902 B2 | 11/2021 | Akada et al. |
| 2010/0029145 A1* | 2/2010 | Balsells ................. H01R 39/20 439/827 |
| 2019/0154096 A1 | 5/2019 | Izumida |
| 2021/0164083 A1 | 6/2021 | Akada et al. |

FOREIGN PATENT DOCUMENTS

| | | |
|---|---|---|
| JP | 2001-180337 | 7/2001 |
| JP | 2002-254108 | 9/2002 |
| JP | 2009-001872 | 1/2009 |
| JP | 2012-248495 | 12/2012 |
| JP | 2013-081982 | 5/2013 |
| WO | 2017/212770 | 12/2017 |

OTHER PUBLICATIONS

Prater Industries, "Hardness of Materials" and "Comparison of Hardness Values", (no date), accessed at praterindustries.com on Dec. 1, 2021. (Year 2021).

Office Action dated May 2, 2022 with respect to the related U.S. Appl. No. 16/616,360.

MatWeb, "Overview of Materials for Brass", accessed on Apr. 27, 2022 at matweb.com (Year: 2022).

* cited by examiner

— Example —

FIG.10

— Comparison Example —

COPPER-COATED STEEL WIRE AND CANTED COIL SPRING

TECHNICAL FIELD

The present disclosure relates to a copper-coated steel wire and a canted coil spring. The present application is based on and claims priority to Japanese Patent Application No. 2018-016440, filed on Feb. 1, 2018, the entire contents of the Japanese Patent Application are hereby incorporated herein by reference.

BACKGROUND ART

Copper-coated steel material of which the surface of steel material is coated with copper may be used as a member for which both conductivity and strength are required. Specifically, for example, a copper-coated steel wire used as a trolley wire (see, for example, Patent Document 1) and a copper-coated steel bar used as a ground electrode (see, for example, Patent Document 2) are known.

PRIOR ART DOCUMENTS

Patent Documents

[Patent Document 1] Japanese Laid-open Patent Publication No. 2001-180337
[Patent Document 2] Japanese Laid-open Patent Publication No. 2002-254108

SUMMARY OF THE INVENTION

According to the present disclosure, a copper-coated steel wire includes: a core wire made of steel having a pearlite structures and a coating layer covering a surface of the core wire and made of Cu (copper) or a Cu alloy. The steel contains C (carbon) by greater than or equal to 0.5% by mass and less than or equal to 1.0% by mass, Si (silicon) by greater than or equal to 0.1% by mass and less than or equal to 2.5% by mass, Mn (manganese) by greater than or equal to 0.3% by mass and less than or equal to 0.9% by mass, and the balance consisting of Fe (iron) and inevitable impurities. In a cross section perpendicular to a longitudinal direction, a value of surface roughness Ra of the core wire is greater than or equal to 25% and less than or equal to 70% of a thickness of the coating layer.

EMBODIMENT FOR CARRYING OUT THE INVENTION

Problem to be Solved by the Present Disclosure

A copper-coated steel wire of a copper-coated steel material may be used for an application in which a cyclic stress is applied. For example, a copper-coated steel wire can be used to make a canted coil spring. By using an electrically conductive material to manufacture a canted coil spring, the canted coil spring can be used, for example, as a contact component.

When a canted coil spring made of a copper-coated steel wire is used, a cyclic stress is applied to the copper-coated steel wire. Due to the cyclic stress, a crack may occur at the interface between the core wire made of steel and the coating layer made of Cu or a Cu alloy, resulting in a decrease in conductivity or breakage of the wire material.

Hence, one object is to provide a copper-coated steel wire and a canted coil spring that enable to suppress an occurrence of a crack at the interface between a core wire and a coating layer.

Effect of the Present Disclosure

According to the present disclosure, it is possible to suppress an occurrence of a crack at the interface between the core wire and the coating layer.

Description of Embodiments of the Present Disclosure

First, aspects of the present disclosure will be listed and described. According to the present disclosure, a copper-coated steel wire includes a core wire made of steel having a pearlite structure; and a coating layer covering a surface of the core wire and made of Cu or a Cu alloy. The steel contains C by greater than or equal to 0.5% by mass and less than or equal to 1.0% by mass, Si by greater than or equal to 0.1% by mass and less than or equal to 2.5% by mass, Mn by greater than or equal to 0.3% by mass and less than or equal to 0.9% by mass, and the balance consisting of Fe and inevitable impurities. In a cross section perpendicular to a longitudinal direction, a value of surface roughness Ra of the core wire is greater than or equal to 25% and less than or equal to 70% of a thickness of the coating layer.

In the copper-coated steel wire of the present disclosure, a high strength core wire made of steel having a perlite structure and a suitable component composition is used. Thereby, it is possible to ensure high durability. Also, the surface of the core wire is covered with a coating layer made of a Cu or Cu alloy with excellent electrical conductivity. Thereby, it is possible to ensure high conductivity.

Furthermore, in the copper-coated steel wire of the present disclosure, in a cross section perpendicular to the longitudinal direction, the value of surface roughness Ra of the core wire is set to be greater than or equal to 25% and less than or equal to 70% of the thickness of the coating layer. In this manner, the bonding strength between the core wire and the coating layer is increased by forming protrusions/recesses on the surface of the core wire. As a result, it is possible to suppress an occurrence of a crack at the interface between the core wire and the coating layer. By setting the value of surface roughness Ra of the core wire to be greater than or equal to 25% of the thickness of the coating layer, the bonding strength between the core wire and the coating layer can be enhanced reliably. By setting the value of surface roughness Ra of the core wire to be less than or equal to 70% of the thickness of the coating layer, the strength of the core wire can be maintained sufficiently. The value of surface roughness Ra of the core wire is preferably greater than or equal to 30% and is more preferably greater than or equal to 35% of the thickness of the coating layer. The value of surface roughness Ra of the core wire is preferably less than or equal to 60% and is more preferably less than or equal to 50% of the thickness of the coating layer.

As described above, according to the copper-coated steel wire according to the present disclosure, it is possible to suppress an occurrence of a crack at the interface between the core wire and the coating layer.

In the copper-coated steel wire, the steel may further contain at least one element selected from a group consisting of Ni by greater than or equal to 0.1% by mass and less than or equal to 0.4% by mass, Cr by greater than or equal to 0.1% by mass and less than or equal to 1.8% by mass, Mo by greater than or equal to 0.1% by mass and less than or equal to 0.4% by mass, and V by greater than or equal to 0.05% by mass and less than or equal to 0.3% by mass. Even in a case in which a core wire made of steel having such a component composition is used, it is possible to provide a copper-coated steel wire that enables to suppress an occurrence of a crack at the interface between the core wire and the coating layer.

Here, the reason why the component composition of the steel constituting the core wire is limited to the above described ranges will be described.

C: greater than or equal to 0.5% by mass and less than or equal to 1.0% by mass

C is an element that greatly effects the strength of steel having a pearlite structure. From the viewpoint of obtaining sufficient strength as a core wire of the copper-coated steel wire, the C content needs to be greater than or equal to 0.5% by mass. On the other hand, when the C content increases, toughness decreases, and working may be difficult. From the viewpoint of securing sufficient toughness, the C content needs to be less than or equal to 1.0% by mass. From the viewpoint of further enhancing strength, the C content is preferably greater than or equal to 0.6% by mass, and is more preferably greater than or equal to 0.8% by mass. From the viewpoint of enhancing toughness to facilitate working, the C content is preferably less than or equal to 0.95% by mass.

Si: greater than or equal to 0.1% by mass and less than or equal to 2.5% by mass Si is an element that is added as a deoxidizing agent in refining of steel. In order to serve as a deoxidizing agent, the Si content needs to be greater than or equal to 0.1% by mass, and is preferably greater than or equal to 0.12% by mass. Also, Si serves as a carbide-generating element in steel and has a property of suppressing softening due to heating (softening resistance). From the viewpoint of suppressing softening in the strain removing heat treatment carried out after the copper-coated steel wire is processed, the Si content is preferably greater than or equal to 0.8% by mass, and may be greater than or equal to 1.8% by mass. On the other hand, excessive addition of Si decreases toughness. From the viewpoint of securing sufficient toughness, the Si content needs to be less than or equal to 2.5% by mass, is preferably less than or equal to 2.3% by mass, and may be less than or equal to 2.2% by mass. From the viewpoint of attaching importance to toughness, the Si content may be less than or equal to 1.0% by mass.

Mn: greater than or equal to 0.3% by mass and less than or equal to 0.9% by mass Mn is an element that is added as a deoxidizing agent in refining of steel, in a similar manner to Si. In order to serve as a deoxidizing agent, the Mn content needs to be greater than or equal to 0.3% by mass. On the other hand, excessive addition of Mn decreases toughness and workability in hot working. Therefore, the Mn content needs to be less than or equal to 0.9% by mass.

Inevitable Impurities

In the manufacturing steps of the core wire, phosphorus (P) and sulfur (S) are inevitably mixed into steel that constitute the core wire. P and S cause grain boundary segregation and generates inclusions, hence degrading characteristics of steel. Therefore, the P content and the S content are each preferably less than or equal to 0.025% by mass. Also, the total content of inevitable impurities is preferably less than or equal to 0.3% by mass.

Ni: greater than or equal to 0.1% by mass and less than or equal to 0.4% by mass Addition of Ni suppresses an occurrence of disconnection of the wire at the time of drawing processing of the core wire and at the time of processing of the copper-coated steel wire. From the viewpoint of reliably demonstrating this function, Ni may be added in an amount of 0.1% by mass or more. On the other hand, even when Ni is added in an amount of more than 0.4% by mass, the effect of Ni is saturated. Also, when Ni, which is an expensive element, is added in an amount of greater than 0.4% by mass, the manufacturing cost of the core wire increases. Therefore, the amount of Ni added is preferably less than or equal to 0.4% by mass.

Cr: greater than or equal to 0.1% and less than or equal to 1.8% by mass

Cr serves as a carbide-generating element in steel and contributes to making the metal structure finer by generation of fine carbides and suppressing softening at the time of heating. From the viewpoint of reliably demonstrating such effects, Cr may be added in an amount of 0.1% by mass or more, may be added in an amount of 0.2% by mass or more, and may be added in an amount of 0.5% by mass or more. On the other hand, excessive addition of Cr causes a decrease in toughness. Therefore, the amount of Cr added is preferably less than or equal to 1.8% by mass. The effects by the addition of Cr become particularly remarkable under coexistence with Si and V. Therefore, Cr is preferably added together with these elements.

Mo: greater than or equal to 0.1% by mass and less than or equal to 0.4% by mass Addition of Mo can increase the durability. From the viewpoint of reliably demonstrating this function, Mo may be added in an amount of 0.1% by mass or more. On the other hand, even when Mo is added in an amount of more than 0.4% by mass, the effect of Mo is saturated. Also, when Mo, which is an expensive element, is added in an amount of more than 0.4% by mass, the manufacturing cost of the core wire increases. Therefore, the amount of Mo added is preferably less than or equal to 0.4% by mass.

V: greater than or equal to 0.05% by mass and less than or equal to 0.3% by mass V serves as a carbide-generating element in steel and contributes to making the metal structure finer by generation of fine carbides and suppressing softening at the time of heating. From the viewpoint of reliably demonstrating such effects, V may be added in an amount of 0.05% by mass or more. On the other hand, excessive addition of V causes a decrease in toughness. From the viewpoint of securing sufficient toughness, the amount of V added is preferably less than or equal to 0.3% by mass. The effects by the addition of V become particularly remarkable under coexistence with Si and Cr. Therefore, V is preferably added together with these elements.

In the copper-coated steel wire, the steel may contain C by greater than or equal to 0.55% by mass and less than or equal to 0.7% by mass, Si by greater than or equal to 1.35% by mass and less than or equal to 2.3% by mass, Mn by greater than or equal to 0.3% by mass and less than or equal to 0.9% by mass, Cr by greater than or equal to 0.2% by mass and less than or equal to 1.8% by mass, V by greater than or equal to 0.05% by mass and less than or equal to 0.30% by mass, and the balance consisting of Fe and inevitable impurities. By adopting steel having such a component composition as the steel constituting the core wire, it is possible to more reliably obtain high durability.

In the copper-coated steel wire, a content of Si of the steel may be greater than or equal to 1.35% by mass and less than or equal to 2.3% by mass. By making the Si content greater than or equal to 1.35% by mass, it is possible to suppress softening in the strain removing heat treatment. By making the content of Si less than or equal to 2.3% by mass, a decrease in toughness can be suppressed.

In the copper-coated steel wire, the steel may contain C by greater than or equal to 0.6% by mass and less than or equal to 1.0% by mass, Si by greater than or equal to 0.12% by mass and less than or equal to 0.32% by mass, Mn by greater than or equal to 0.3% by mass and less than or equal to 0.9% by mass, and the balance consisting of Fe and inevitable impurities.

Also, in the copper-coated steel wire, the steel may contain C by greater than or equal to 0.6% by mass and less than or equal to 1.0% by mass, Si by greater than or equal to 0.7% by mass and less than or equal to 1.0% by mass, Mn by greater than or equal to 0.3% by mass and less than or equal to 0.9% by mass, and the balance consisting of Fe and inevitable impurities.

By adopting steel having such a component composition as the steel constituting the core wire, it is possible to more reliably obtain high durability.

In the copper-coated steel wire, at an interface between the core wire and the coating layer, an alloy layer made of an alloy of a metal constituting the core wire and a metal constituting the coating layer may be formed. In this manner, the bonding force between the core wire and the coating layer can be increased, and an occurrence of a crack at the interface between the core wire and the coating layer can be more reliably suppressed.

The tensile strength of the copper-coated steel wire may be greater than or equal to 900 MPa and less than or equal to 3800 MPa. By making the tensile strength greater than or equal to 900 MPa, sufficient strength is easily obtained. By making the tensile strength greater than or equal to 3800 MPa, sufficient workability is easily ensured.

The conductivity of the copper-coated steel wire may be greater than or equal to 15% IACS (International Annealed Copper Standard) and less than or equal to 80% IACS. In this manner, conductivity sufficient for various applications is easily obtained.

In the copper-coated steel wire, the coating layer is a plating layer. In this manner, the bonding force between the core wire and the coating layer can be increased, and an occurrence of a crack at the interface between the core wire and the coating layer can be more reliably suppressed.

In the copper-coated steel wire, an oxygen concentration at the interface between the core wire and the coating layer may be less than or equal to 10% by mass. In this manner, the bonding force between the core wire and the coating layer (plating layer) can be increased, and an occurrence of a crack at the interface between the core wire and the coating layer can be more reliably suppressed. The oxygen concentration at the interface between the core wire and the coating layer is preferably less than or equal to 5% by mass, and is more preferably less than or equal to 3% by mass.

The copper-coated steel wire may include, on a surface of the coating layer, a surface layer including at least one selected from a group consisting of an Au (gold) layer, an Ag (silver) layer, a Sn (tin) layer, a Pd (palladium) layer, a Ni (nickel) layer, and an alloy layer of these metals. In this manner, corrosion resistance, solderability, conductivity, fatigue strength, and the like can be enhanced on the surface of the copper-coated steel wire 1.

In the copper-coated steel wire, the thickness of the coating layer may be greater than or equal to 10 μm and less than or equal to 65 μm. By making the thickness of the coating layer greater than or equal to 10 μm, sufficient conductivity is easily obtained. By making the thickness of the coating layer less than or equal to 65 μm, high strength is easily obtained. From the viewpoint of obtaining higher strength, the thickness of the coating layer may be less than or equal to 50 μm.

In the copper-coated steel wire, a diameter of the core wire may be greater than or equal to 0.01 mm and less than or equal to 1.0 mm. In this manner, a copper-coated steel wire that is particularly suitable for manufacturing a conductive part, such as a canted coil spring, can be obtained.

A canted coil spring according of the present disclosure is made of the copper-coated steel wire described above. By the copper-coated steel wire according to the present disclosure in which an occurrence of a crack at the interface between the core wire and the coating layer is suppressed, according to a canted coil spring of the present disclosure, it is possible to provide a canted coil spring that is excellent in durability.

Details of Embodiment of the Present Disclosure

Next, an embodiments of a copper-coated steel wire and a canted coil spring according to the present disclosure will be described with reference to the drawings. It should be noted that in the following drawings, the same reference numerals are assigned to the same or equivalent parts such that repetitive descriptions are omitted.

Figure 1:
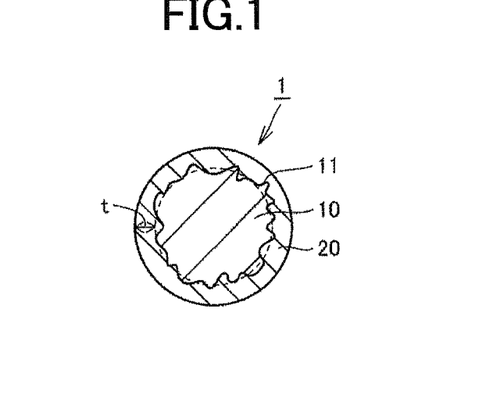
FIG. 1 is a schematic cross-sectional view illustrating a cross-section perpendicular to the longitudinal direction of a copper-coated steel wire.

With reference to FIG. 1, a copper-coated steel wire 1 according to the present embodiment includes a core wire 10 and a coating layer 20. The core wire 10 is made of steel having a perlite structure. The coating layer 20 covers a surface 11 of the core wire 10. The coating layer 20 is made of Cu or a Cu alloy. The cross section perpendicular to the longitudinal direction of the copper-coated steel wire 1 is circular.

The steel constituting the core wire 10 contains C by greater than or equal to 0.5% by mass and less than or equal to 1.0% by mass, Si by greater than or equal to 0.1% by mass and less than or equal to 2.5% by mass, M by greater than or equal to 0.3% by mass and less than or equal to 0.9% by mass, and the balance consisting of Fe and inevitable impurities.

In a cross section perpendicular to the longitudinal direction, the value of surface roughness Ra of the surface 11 of the core wire 10 is greater than or equal to 25% and less than or equal to 70% of the thickness t of the coating layer 20. Here, the thickness t of the coating layer 20 can be determined as follows. First, the area of the core wire 10 in a cross section perpendicular to the longitudinal direction is measured. Next, the radius of the circle (which is indicated by the dashed line in FIG. 1) corresponding to the obtained area (radius corresponding to the circle) is calculated. Then, the difference between the radius of the copper-coated steel wire 1 and the radius corresponding to the circle of the core wire 10 is defined as the thickness t of the coating layer 20.

In the copper-coated steel wire 1, a high strength core wire 10 that has a perlite structure and is made of steel having a suitable component composition is used. Thereby, high durability is ensured. Also, the surface 11 of the core wire 10 is covered with the coating layer 20 made of Cu or Cu alloy excellent in electrical conductivity. Thereby, high conductivity is ensured.

Further, in a cross section perpendicular to the longitudinal direction of the copper-coated steel wire 1, the value of surface roughness Ra of the core wire 10 is set to be greater than or equal to 25% and less than or equal to 70% of the thickness of the coating layer 20. In this manner, the bonding strength between the core wire 10 and the coating layer 20 is increased by forming protrusions/recesses on the surface 11 of the core wire 10. As a result, it is possible to suppress an occurrence of a crack at the interface between the core wire 10 and the coating layer 20. As described above, the copper-coated steel wire 1 according to the present embodiment is a copper-coated steel wire in which an occurrence of a crack at the interface between the core wire 10 and the coating layer 20 is suppressed.

Figures 2, 3:
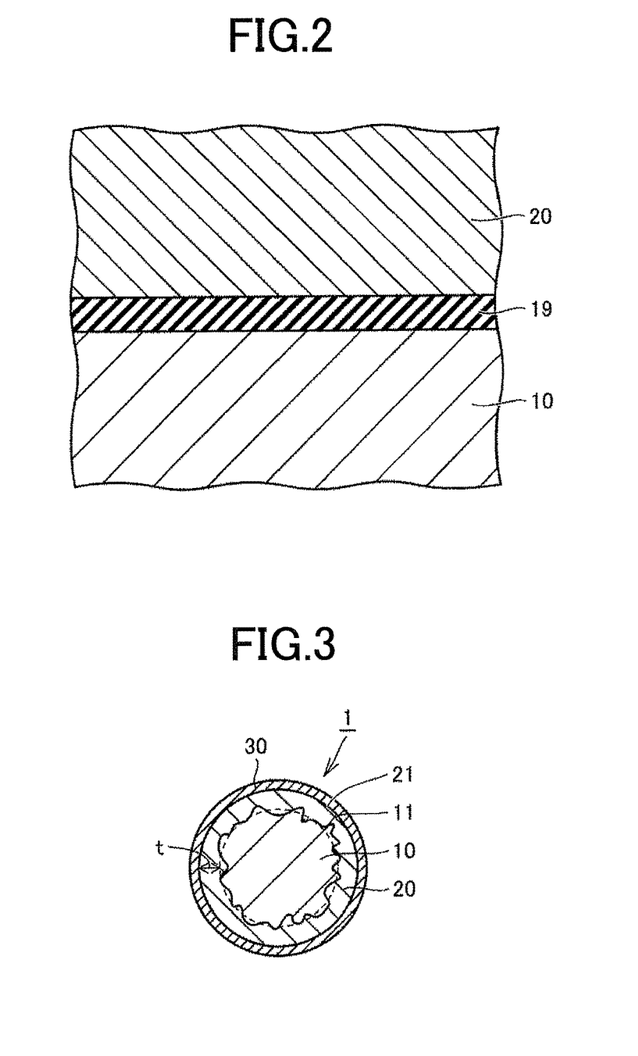
FIG. 2 is a schematic cross-sectional view illustrating a structure near the interface between a core wire and a coating layer.
FIG. 3 is a schematic cross-sectional view illustrating a cross-section perpendicular to the longitudinal direction of a copper-coated steel wire according to a modified example.

FIG. 2 is a schematic cross-sectional view illustrating a structure near the interface between the core wire 10 and the coating layer 20. With reference to FIG. 2, in the present embodiment, at the interface between the core wire 10 and the coating layer 20, an alloy layer 19 consisting of an alloy of metal constituting the core wire 10 and metal constituting the coating layer 20 is formed. Although the presence of the alloy layer 19 is not essential for a copper-coated steel wire according to the present disclosure, in the copper-coated steel wire 1 of the present embodiment including the alloy layer 19, the bonding force between the core wire 10 and the coating layer 20 is increased, and an occurrence of a crack at the interface between the core wire 10 and the coating layer 20 is more reliably suppressed.

FIG. 3 is a schematic cross-sectional view illustrating a cross section perpendicular to the longitudinal direction of a copper-coated steel wire 1 according to a modified example. With reference to FIG. 3 and FIG. 1, the copper-coated steel wire 1 according to the modified example has a structure that is basically similar to that of the copper-coated steel wire 1 described with reference to FIG. 1 and FIG. 2. However, the copper-coated steel wire 1 according to the modified example differs from the copper-coated steel wire 1 of FIG. 1 described above in that, on a surface layer including 30 at least one selected from a group consisting of an Au layer, an Ag layer, a Sn layer, a Pd layer, a Ni layer, and an alloy layer of these metals is included. The presence of the surface layer 30 is not essential for a copper-coated steel wire according to the present disclosure. However, in the copper-coated steel wire 1 according to the present embodiment including the surface layer 30, corrosion resistance, solderability, conductivity, fatigue strength, and the like on the surface of the copper-coated steel wire 1 can be enhanced.

Figure 4:
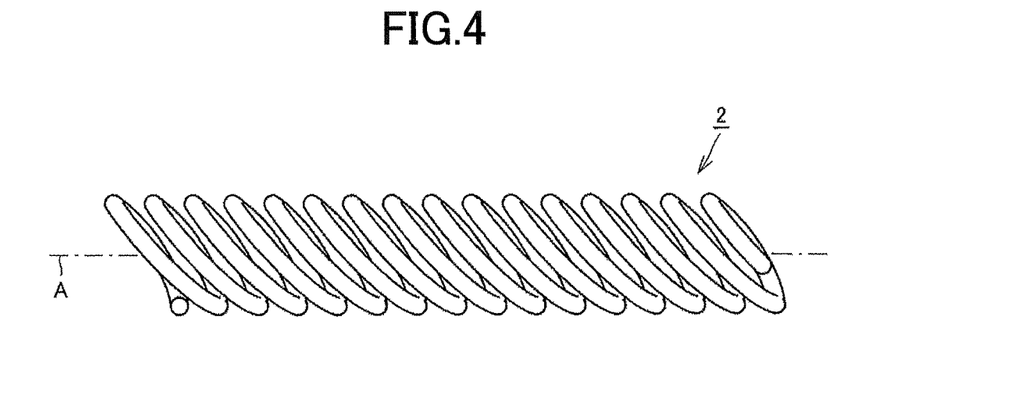
FIG. 4 is a schematic view illustrating a structure of a canted coil spring.

FIG. 4 is a schematic diagram illustrating the structure of a canted coil spring. With reference to FIG. 4, the canted coil spring 2 according to the present embodiment is made of the copper-coated steel wire 1 according to the present embodiment. The canted coil spring 2 is a helical spring having a structure in which the copper-coated steel wire 1 is wound, while being inclined with respect to the plane perpendicular to the direction (axial direction) along the central axis A. The canted coil spring 2 is used such that a load in a direction perpendicular to the axial direction is applied.

The canted coil spring 2 is made of the copper-coated steel wire 1 in which an occurrence of a crack at the interface between the core wire 10 and the coating layer 20 is suppressed, and therefore, the canted coil spring 2 is a canted coil spring that is excellent in durability.

In the copper-coated steel wire 1 and the canted coil spring 2, the steel constituting the core wire 10 may further contain at least one element selected from a group consisting of Ni by greater than or equal to 0.1% by mass and less than or equal to 0.4% by mass, Cr by greater than or equal to 0.1% by mass and less than or equal to 1.8% by mass, Mo by greater than or equal to 0.1% by mass and less than or equal to 0.4% by mass, and V by greater than or equal to 0.05% by mass and less than or equal to 0.3% by mass. Even in a case in which the core wire 10 made of steel having such a component composition is adopted, the copper-coated steel wire 1 and the canted coil spring 2 are excellent in durability while suppressing an occurrence of a crack at the interface between the core wire 10 and the coating layer 20.

In the copper-coated steel wire 1 and the canted coil spring 2, the content of Si of the steel constituting the core wire 10 may be greater than or equal to 1.35% by mass and less than or equal to 2.3% by mass. By making the content of Si greater than or equal to 1.35% by mass, it is possible to suppress softening in a heat treatment. By making the content of Si less than or equal to 2.3% by mass, a decrease in toughness can be suppressed.

In the copper-coated steel wire 1 and the canted coil spring 2, the steel constituting the core wire 10 may contain C by greater than or equal to 0.6% by mass and less than or equal to 1.0% by mass, Si by greater than or equal to 0.12% by mass and less than or equal to 0.32% by mass, Mn by greater than or equal to 0.3% by mass and less than or equal to 0.9% by mass, and the balance consisting of Fe and inevitable impurities.

Also, in the copper-coated steel wire 1 and the canted coil spring 2, the steel constituting the core wire 10 may contain C by greater than or equal to 0.6% by mass and less than or equal to 1.0% by mass, Si by greater than or equal to 0.7% by mass and less than or equal to 1.0% by mass, Mn by greater than or equal to 0.3% by mass and less than or equal to 0.9% by mass, and the balance consisting of Fe and inevitable impurities.

Also, in the copper-coated steel wire 1 and the canted coil spring 2, the steel constituting the core wire 10 may contain C by greater than or equal to 0.55% by mass and less than or equal to 0.7% by mass, Si by greater than or equal to 1.35% by mass and less than or equal to 2.3% by mass, Mn by greater than or equal to 0.3% by mass and less than or equal to 0.9% by mass, Cr by greater than or equal to 0.2% by mass and less than or equal to 1.8% by mass, V by greater than or equal to 0.05% by mass and less than or equal to 0.30% by mass, and the balance consisting of Fe and inevitable impurities.

By adopting steel having such a component composition as the steel constituting the core wire 10, it is possible to more reliably obtain high durability.

In copper-coated steel wire 1 and the canted coil spring 2, the coating layer 20 may be a plating layer. Thereby, the bonding force between the core wire 10 and the coating layer 20 can be increased, and an occurrence of a crack at the interface between the core wire 10 and the coating layer 20 can be more reliably suppressed.

In the copper-coated steel wire 1 and the canted coil spring 2, it is preferable that the oxygen concentration at the interface between the core wire 10 and the coating layer 20 is less than or equal to 10% by mass. Thereby, the bonding force between the core wire 10 and the coating layer 20 (plating layer) can be increased, and an occurrence of a crack at the interface between the core wire 10 and the coating layer 20 can be more reliably suppressed. It should be noted that the oxygen concentration at the interface between the core wire 10 and the coating layer 20 can be measured, for example, by performing a quantitative analysis using EDS (Energy Dispersive X-ray Spectrometry) with respect to a square area of 300 μm for each side including the interface between the core wire 10 and the coating layer 20 in a cross section perpendicular to the longitudinal direction of the copper-coated steel wire 1.

It is preferable that the tensile strength of the copper-coated steel wire 1 is greater than or equal to 900 MPa and less than or equal to 3800 MPa. By making the tensile strength greater than or equal to 900 MPa, sufficient strength is easily obtained. By making the tensile strength greater than or equal to 3800 MPa, sufficient workability is easily ensured.

It is preferable that the conductivity of the copper-coated steel wire 1 and the canted coil spring 2 is greater than or equal to 15% IACS and less than or equal to 80% IACS. Thereby, conductivity sufficient in various applications can be easily obtained.

In the copper-coated steel wire 1 and the canted coil spring 2, it is preferable that the thickness of the coating layer 20 is greater than or equal to 10 μm and less than or equal to 65 μm. By making the thickness of the coating layer 20 greater than or equal to 10 μm, sufficient conductivity is easily obtained. By making the thickness of the coating layer 20 less than or equal to 65 μm, high strength is easily obtained.

In the copper-coated steel wire 1, it is preferable that a diameter of the core wire 10 is greater than or equal to 0.05 mm and less than or equal to 2.0 mm. Thus, a copper-coated steel wire that is particularly suitable for manufacturing a conductive part, such as a canted coil spring, can be obtained.

Figure 5:
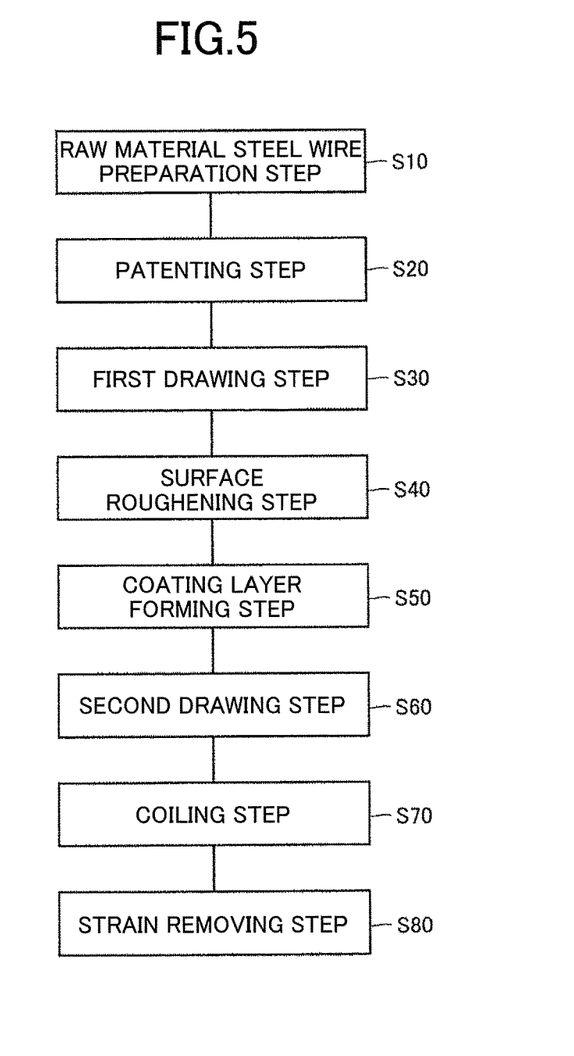
FIG. 5 is a flowchart illustrating an outline of a method of manufacturing a copper-coated steel wire and a canted coil spring.

Next, an example of a method of manufacturing a copper-coated steel wire 1 and a canted coil spring 2 will be described below. With reference to FIG. 5, in the method of manufacturing the copper-coated steel wire 1 and the canted coil spring 2 according to the present embodiment, first, a raw material steel wire preparation step (S10) is carried out. In this step (S10), a steel wire to form a core wire 10 is prepared. Specifically, a steel wire formed of steel containing C by greater than or equal to 0.5% by mass and less than or equal to 1.0% by mass, Si by greater than or equal to 0.1% by mass and less than or equal to 2.5% by mass, Mn by greater than or equal to 0.3% by mass and less than or equal to 0.9% by mass, and the balance consisting of Fe and inevitable impurities is prepared. The steel constituting the steel wire may further contain at least one element selected from a group consisting of Ni by greater than or equal to 0.1% by mass and less than or equal to 0.4% by mass, Cr by greater than or equal to 0.1% by mass and less than or equal to 1.8% by mass, Mo by greater than or equal to 0.1% by mass and less than or equal to 0.4% by mass, and V by greater than or equal to 0.05% by mass and less than or equal to 0.3% by Mass.

Next, a patenting step (S20) is carried out. In this step (S20), the raw material steel wire prepared in the step (S10) is subjected to patenting. Specifically, a heat treatment is carried out in which the raw material steel wire is heated to a temperature range greater than or equal to the austenitizing temperature ($A_1$ point), then rapidly cooled to a temperature range higher than the martensitic transformation starting temperature (Ms point), and held in this temperature range. Thereby, the metal structure of the raw material steel wire becomes a fine pearlite structure with small lamellar spacing. Here, in the patenting treatment, the treatment of heating the raw material steel wire to a temperature range greater than or equal to the A point is carried out in an inert gas atmosphere from the viewpoint of suppressing an occurrence of decarburization.

Figure 6:
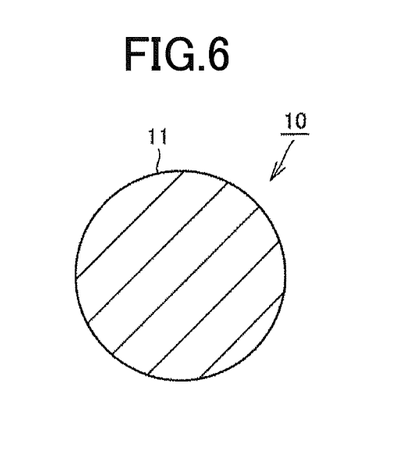
FIG. 6 is a schematic cross-sectional view for describing the method of manufacturing the copper-coated steel wire and the canted coil spring.

Next, a first drawing step is carried out as the step (S30). In this step (S30), the raw material steel wire subjected to patenting in the step (S20) is drawn (pulled). Thereby, with reference to FIG. 6, a core wire 10 which that has a pearlite structure and whose cross section perpendicular to the longitudinal direction is circular is obtained.

Figure 7:
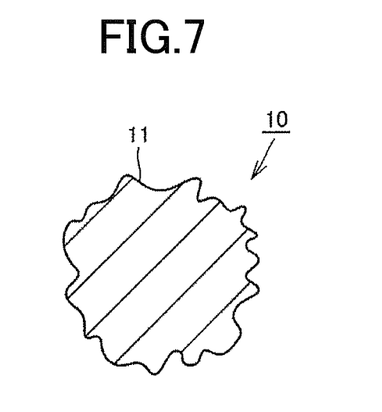
FIG. 7 is a schematic cross-sectional view for describing the method of manufacturing the copper-coated steel wire and the canted coil spring.

Next, a surface roughening step is carried out as the step (S40). In this step (S40), a surface roughening treatment is carried out to increase the surface roughness with respect to the core wire 10 obtained by the wire drawing process in the step (S30). Specifically, with reference to FIG. 6 and FIG. 7, by causing the surface 11 of the core wire 10 to be in contact with an acid, such as hydrochloric acid or sulfuric acid, the surface roughness is increased. The concentration of hydrochloric acid can be, for example, 35%. The concentration of sulfuric acid can be, for example, 65%. In the manufacturing process of a steel wire, a pickling treatment may be performed in order to clean the surface of the steel wire and remove the oxide coating. However, unlike a typical pickling treatment, the surface roughening treatment in the step (S40) achieves surface roughening by using a high concentration of acid or a highly corrosive acid or by increasing the time of contact with the acid. The surface roughness Ra at this point of time can be, for example, greater than or equal to 0.8 μm. As a surface roughening treatment, instead of a treatment of contacting an acid or in addiction to a treatment of contacting an acid, a treatment of mechanically achieving surface roughening may be performed by pressing a polishing non-woven fabric against the surface 11 of the core wire 10 while moving the non-woven fabric relative to the surface 11.

Figure 8:
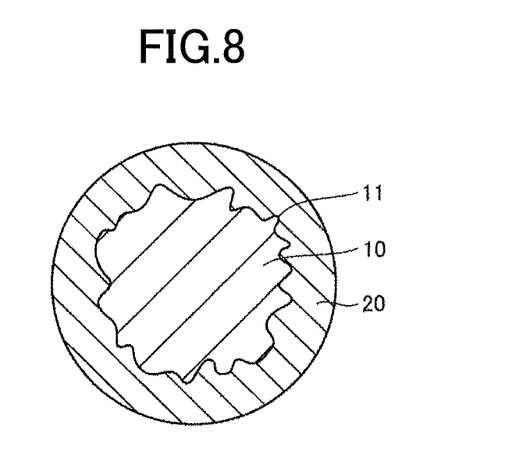
FIG. 8 is a schematic cross-sectional view for describing the method of manufacturing the copper-coated steel wire and the canted coil spring.

Next, a coating layer forming step is carried out as the step (S50). In this step (S50), with reference to FIG. 7 and FIG. 8, a coating layer 20 made of Cu or a Cu alloy is formed so as to cover the surface 11 of the core wire 10 on which the surface roughening process is performed in the step (S40). The thickness of the coating layer 20 formed in the step (50) is, for example, greater than or equal to 30 μm and less than or equal to 90 μm. The coating layer 20 may be formed, for example, by plating, or may be formed as a cladding layer obtained by mechanically integrating a separately prepared member to from the coating layer 20 with respect to the core wire 10.

Next, a second drawing step (S50) is carried out. In this step (S50), with reference to FIG. 8 and FIG. 1, the core wire 10 on which the coating layer 20 has been formed in the step (S50) is drawn. Thereby, the copper-coated steel wire 1 having a desired diameter is obtained. The processing degree (area reduction rate) and the true strain in the step (S60) can be respectively set to greater than or equal to 90% and greater than or equal to 2.3, for example. Sufficient surface roughness can be imparted to the surface 11 of the core wire 10 by performing processing stronger than an ordinary wire drawing, which has a processing degree of 85% or less and a true strain of 2.0 or less. Further, by performing strong processing in the step (S60), it becomes easy to form the alloy layer 19. Through the procedure described above, manufacturing of copper-coated steel wire 1 according to the present embodiment is completed. In the following, a method of manufacturing a canted coil spring 2 by using the copper-coated steel wire 1 will be described.

Next, a coiling step (S70) is carried out. In this step (S70), with reference to FIG. 1 and FIG. 4, the copper-coated steel wire 1 obtained in the step (S60) is processed into the shape of a canted coil spring 2. Specifically, the copper-coated steel wire 1 is processed into a helical shape to form the shape of a canted coil spring 2.

Next, a strain removing step (S80) is carried out. In this step (S80), a heat treatment is carried out in which the copper-coated steel wire 1 that has been formed into the shape of a canted coil spring 2 in the step (S70) is heated to a temperature range greater than or equal to 250° C. and less than or equal to 400° C. Thereby, the strain introduced into copper-coated steel wire 1 by the process in the step (S70) is reduced. As a result, a wide nonlinear area can be obtained. Through the procedure described above, manufacturing of the canted coil spring 2 according to the present embodiment is completed.

According to the method of manufacturing a copper-coated steel wire and a canted coil spring according to the present embodiment, it is possible to easily manufacture the copper-coated steel wire 1 and the canted coil spring 2 according to the present embodiment that enable to suppress an occurrence of a crack at the interface between the core wire 10 and the coating layer 20.

In the steel constituting the raw material steel wire prepared in the step (S10), the content of Si may be greater than or equal to 1.35% by mass and less than or equal to 2.3% by mass.

Also, the steel constituting the raw material steel wire prepared in the step (S10) may contain C by greater than or equal to 0.6% by mass and less than or equal to 1.0% by mass, Si by greater than or equal to 0.12% by mass and less than or equal to 0.32% by mass, Mn by greater than or equal to 0.3% by mass and less than or equal to 0.9% by mass, and the balance consisting of Fe and inevitable impurities.

Furthermore, the steel constituting the raw material steel wire prepared in the step (S10) may contain C by greater than or equal to 0.6% by mass and less than or equal to 1.0% by mass, Si by greater than or equal to 0.7% by mass and less than or equal to 1.0% by mass, Mn by greater than or equal to 0.3% by mass and less than or equal to 0.9% by mass, and the balance consisting of Fe and inevitable impurities.

Furthermore, the steel constituting the raw material steel wire prepared in the step (S10) may contain C by greater than or equal to 0.55% by mass and less than or equal to 0.7% by mass, Si by greater than or equal to 1.35% by mass and less than or equal to 2.3% by mass, Mn by greater than or equal to 0.3% by mass and less than or equal to 0.9% by mass, Cr by greater than or equal to 0.2% by mass and less than or equal to 1.8% by mass, V by greater than or equal to 0.05% by mass and less than or equal to 0.30% by mass, and the balance consisting of Fe and inevitable impurities.

By adopting steel having such a component composition as the steel constituting the core wire, it is possible to more reliably obtain high durability.

EXAMPLES

An experiment was conducted to investigate the effect of the value of surface roughness Ra of the core wire with respect to the thickness of the coating layer in a cross section perpendicular to the longitudinal direction on the characteristics of the copper-coated steel wire. First, steps (S10) to (S60) according to the above-described embodiment were performed, and Sample of the copper-coated steel wire 1 was prepared. As steel constituting a raw material steel wire prepared in the step (S10), steel containing 0.82% by mass of C, 0.22% by mass of Si, 0.45% by mass of Mn, and the balance of iron and inevitable impurities was used. As a result of analyzing the amounts of elements contained as inevitable impurities, P was 0.011% by mass, S was 0.008% by mass, and Cu was 0.000% by mass. In the step (S50), a coating layer 20 made of pure copper was formed by plating (Example). For comparison, step (S40) was omitted and Sample was prepared similarly (Comparison Example). Photographs of cross-sections of Samples of Example and Comparative Example are respectively indicated by FIG. 9 and FIG. 10.

Figure 9:
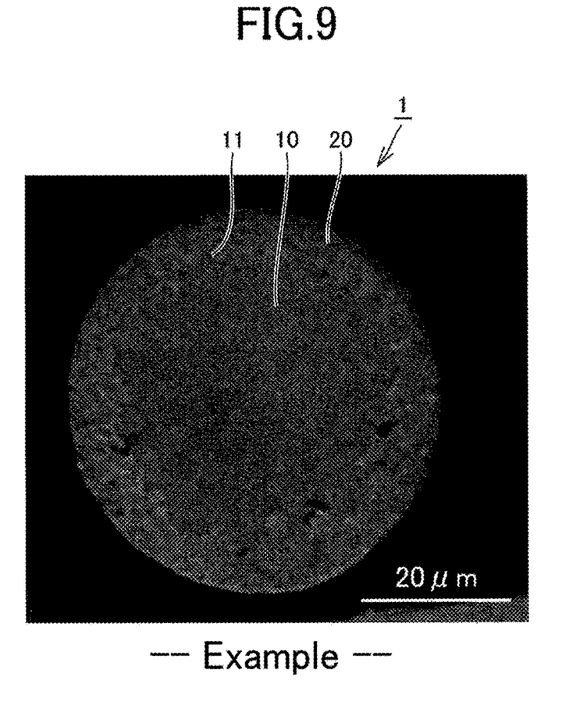
FIG. 9 is a photograph illustrating a cross-section of a copper-coated steel wire of Example.
Figure 10:
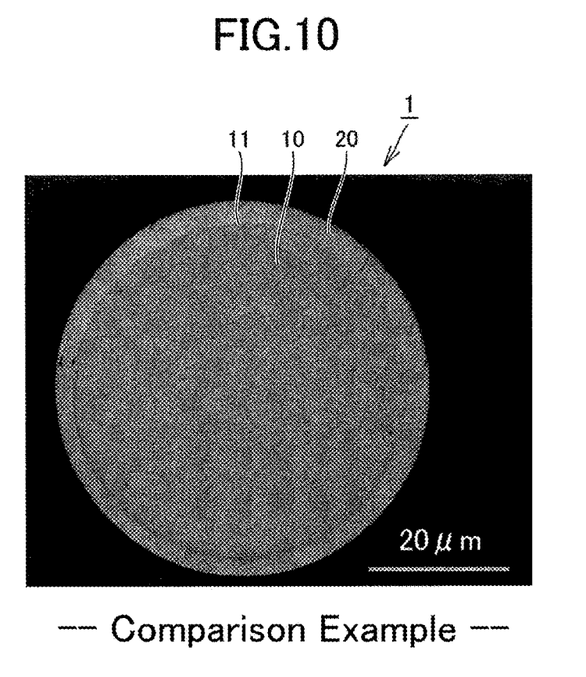
FIG. 10 is a photograph illustrating a cross-section of a copper-coated steel wire of Comparative Example.

With reference to FIG. 10, in a case of not performing the step (S40), the surface of the core wire 10 has a smooth true circle shape. On the other hand, as indicated by FIG. 9, it was confirmed that the surface roughness of the core wire 10 can be increased by performing the step (S40).

Figure 11:
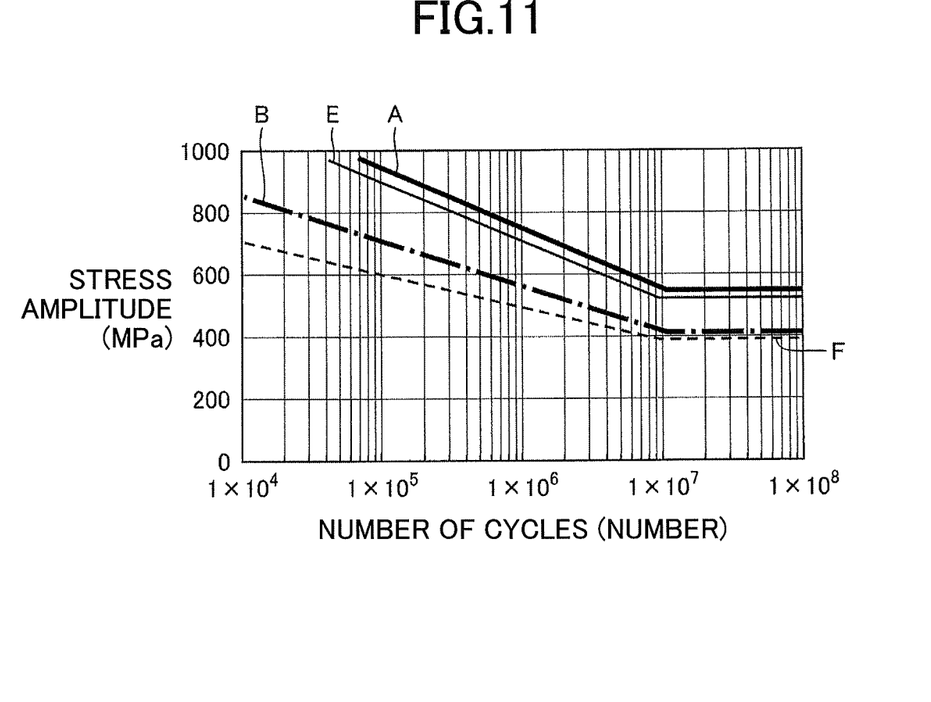
FIG. 11 is a diagram illustrating a result of a fatigue strength test.
Figure 12:
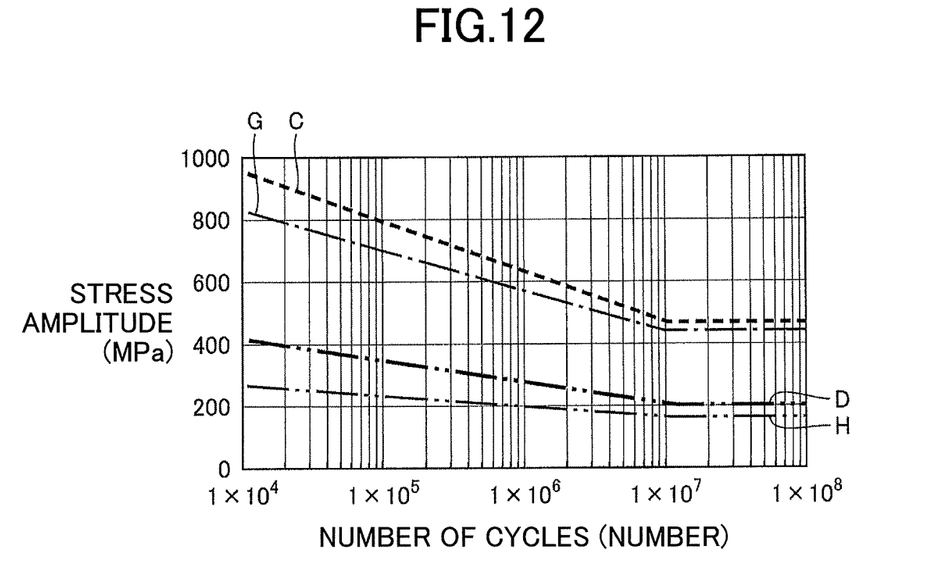
FIG. 12 is a diagram illustrating a result of a fatigue strength test.
Figure 13:
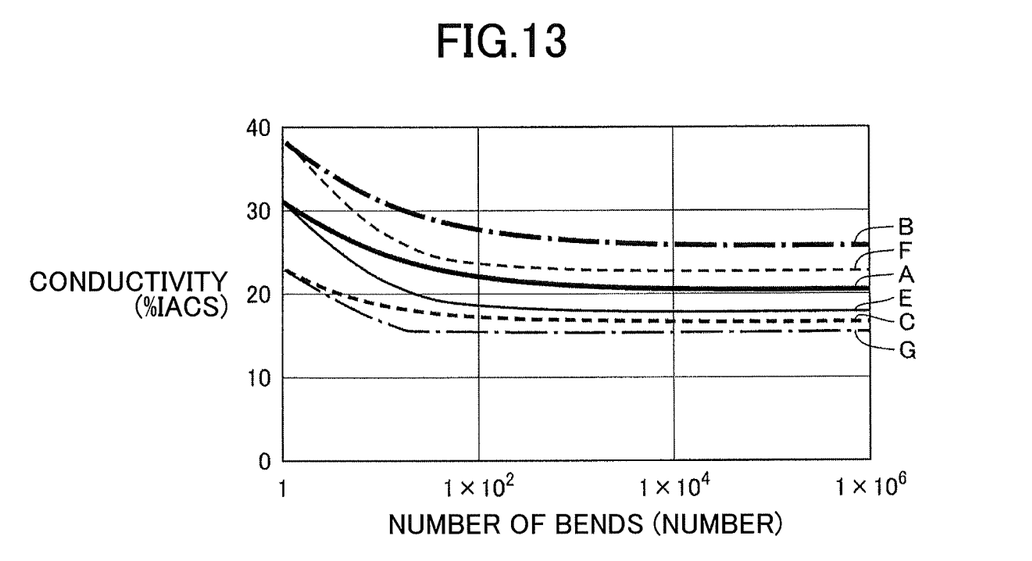
FIG. 13 is a diagram illustrating a relationship between the number of bends and the conductivity.
Figure 14:
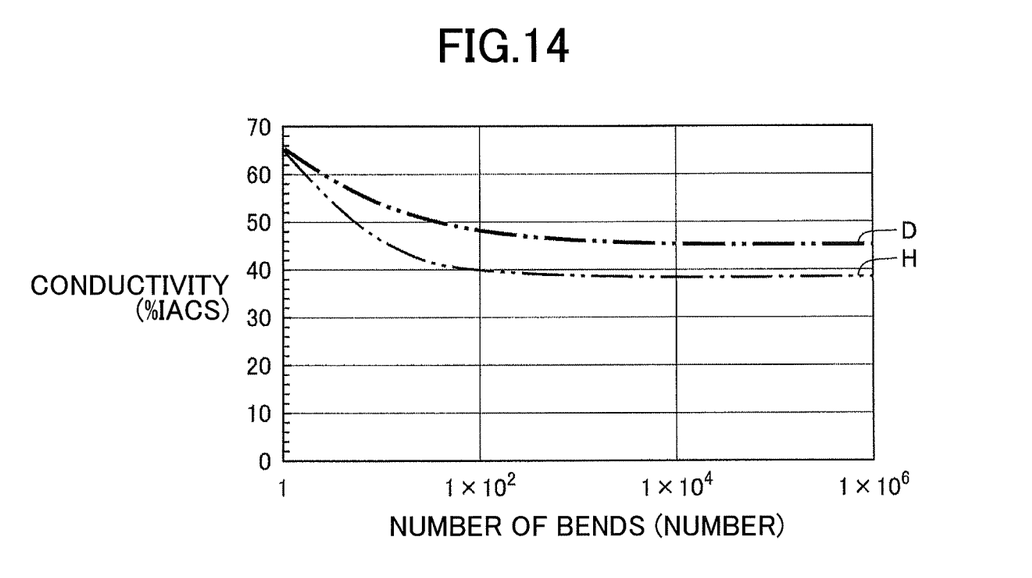
FIG. 14 is a diagram illustrating a relationship between the number of bends and the conductivity.

Next, Samples (Samples A to H) obtained by varying the outer diameter of the core wire 10 and the thickness of the coating layer 20 and varying the conditions of the step (S40) to vary the roughness of the surface 11 of the core wire 10 were prepared, and a tensile test, a conductivity measurement, and a fatigue test were performed. A Hunter fatigue test was performed as a fatigue test. The structures and test results of the copper-coated steel wire 1 are indicated by Table 1. Also, the relationship between the number of cycles of stress to failure in the fatigue test and the stress amplitude (S-N diagram) is indicated by FIG. 11 and FIG. 12. In addition, Samples were cyclically bent to investigate the relationship between the number of bends and the conductivity. The investigation results are indicated by FIG. 13 and FIG. 14.

TABLE 1

| | WIRE DIAMETER (mm) | CORE WIRE DIAMETER (mm) | COATING LAYER THICKNESS (μm) | PERCENTAGE OF SURFACE ROUGHNESS (%) | TENSILE STRENGTH (MPa) | CONDUCTIVITY (% IACS) | STRESS AMPLITUDE (MPa) |
|---|---|---|---|---|---|---|---|
| A | 0.030 | 0.025 | 2.5 | 36 | 2805 | 32.5 | 550 |
| B | 0.050 | 0.040 | 5.0 | 40 | 2038 | 37.1 | 420 |
| C | 0.130 | 0.115 | 7.5 | 28 | 1942 | 23.2 | 480 |
| D | 0.150 | 0.090 | 30.0 | 55 | 1147 | 65.6 | 200 |
| E | 0.030 | 0.025 | 2.5 | 23 | 2790 | 31.3 | 510 |
| F | 0.050 | 0.040 | 5.0 | 20 | 1035 | 36.7 | 390 |
| G | 0.130 | 0.115 | 7.5 | 12 | 1944 | 21.9 | 440 |
| H | 0.150 | 0.090 | 30.0 | 15 | 1137 | 64.4 | 170 |

In Table 1, "WIRE DIAMETER" means the outer diameter of the copper-coated steel wire 1. "CORE WIRE DIAMETER" means the diameter corresponding to the circle of the core wire 10 (twice the radius corresponding to the circle). "COATING LAYER THICKNESS" means the thickness t of the coating layer 20. "PERCENTAGE OF SURFACE ROUGHNESS" means the percentage of the value of surface roughness Ra of the core wire 10 to the thickness t of the coating layer 20 in a cross section perpendicular to the longitudinal direction. "TENSILE STRENGTH" means the breaking load in the tensile test of the copper-coated steel wire 1. "CONDUCTIVITY" means the conductivity of the copper-coated steel wire 1 obtained by the conductivity measurement. "STRESS AMPLITUDE" means the maximum stress amplitude at which the copper-coated steel wire 1 does not break even by $1 \times 10^8$ cycles of stress in the fatigue test. Samples A to D correspond to Examples that are copper-coated steel wires according to the present disclosure. Samples E to H correspond to Comparative Example that are outside the scope of copper-coated steel wires of the present disclosure.

With reference to Table 1, it is confirmed that, for each of Samples A to H, the tensile strength is greater than or equal to 900 MPa and less than or equal to 3800 MPa and the conductivity is greater than or equal to 15% IACS and less than or equal to 80% IACS, which are in appropriate ranges. With reference to Table 1 and FIG. 11 and FIG. 12, comparing respectively Samples A and E, B and F, C and G, and D and H, which differ only in the percentage of surface roughness in the structure of the copper-coated steel wire 1, it can be seen that the fatigue strength is enhanced in Examples (Samples A to D) of which the percentage of surface roughness is in the range of 25% to 70% in comparison to Comparative Examples (Samples E to H) of which the percentage of surface roughness is outside the range of 25% to 70%. Also, with reference to Table 1 and FIG. 13 and FIG. 14, similarly comparing the conductivity of Samples A and E, B and F, C and G, and D and H, respectively, while Examples (Samples A to D) and Comparative Examples (Samples E to H) are equivalent in the conductivity before performing bends, a decrease in the conductivity due to repeating bends is reduced in Examples in comparison to Comparative Examples. It is considered that this is because an occurrence of a crack at the interface between the core wire 10 and the coating layer 20 was suppressed in Examples in which the percentage of surface roughness is in the range of 25% to 70% in comparison to Comparative Examples in which the percentage of surface roughness is outside the range of 25% to 70%.

The embodiments disclosed above should be considered exemplary in all respects and not limiting. The scope of the present invention is not defined by the above but defined by claims and is intended to include all changes within the meaning and scope of equivalence with the claims.

DESCRIPTION OF THE REFERENCE NUMERALS

1 Copper-coated steel wire
10 Core wire
11 Surface
19 Alloy layer
20 Coating layer
21 Surface
30 Surface layer

The invention claimed is:
1. A copper-coated steel wire comprising:
a core wire made of steel having a pearlite structure; and
a coating layer covering a surface of the core wire and made of Cu or a Cu alloy,
wherein the steel contains C by greater than or equal to 0.5% by mass and less than or equal to 1.0% by mass, Si by greater than or equal to 0.1% by mass and less than or equal to 2.5% by mass, Mn by greater than or equal to 0.3% by mass and less than or equal to 0.9% by mass, and the balance consisting of Fe and inevitable impurities,
wherein in a cross section perpendicular to a longitudinal direction, a value of surface roughness Ra of the core wire is greater than or equal to 25% and less than or equal to 70% of a thickness of the coating layer, and
wherein the coating layer is a plating layer, and an oxygen concentration at an interface between the core wire and the coating layer is less than or equal to 10% by mass.
2. The copper-coated steel wire according to claim 1, wherein the steel further contains at least one element selected from a group consisting of Ni by greater than or equal to 0.1% by mass and less than or equal to 0.4% by mass, Cr by greater than or equal to 0.1% by mass and less than or equal to 1.8% by mass, Mo by greater than or equal to 0.1% by mass and less than or equal to 0.4% by mass, and V by greater than or equal to 0.05% by mass and less than or equal to 0.3% by mass.
3. The copper-coated steel wire according to claim 2, wherein the steel contains C by greater than or equal to 0.55% by mass and less than or equal to 0.7% by mass, Si by greater than or equal to 1.35% by mass and less than or equal to 2.3% by mass, Mn by greater than or equal to 0.3% by mass and less than or equal to 0.9% by mass, Cr by greater than or equal to 0.2% by mass and less than or equal to 1.8% by mass, V by greater than or equal to 0.05% by mass and less than or equal to 0.30% by mass, and the balance consisting of Fe and inevitable impurities.

4. The copper-coated steel wire according to claim 1, wherein a content of Si of the steel is greater than or equal to 1.35% by mass and less than or equal to 2.3% by mass.

5. The copper-coated steel wire according to claim 1, wherein the steel contains C by greater than or equal to 0.6% by mass and less than or equal to 1.0% by mass, Si by greater than or equal to 0.12% by mass and less than or equal to 0.32% by mass, Mn by greater than or equal to 0.3% by mass and less than or equal to 0.9% by mass, and the balance consisting of Fe and inevitable impurities.

6. The copper-coated steel wire according to claim 1, wherein the steel contains C by greater than or equal to 0.6% by mass and less than or equal to 1.0% by mass, Si by greater than or equal to 0.7% by mass and less than or equal to 1.0% by mass, Mn by greater than or equal to 0.3% by mass and less than or equal to 0.9% by mass, and the balance consisting of Fe and inevitable impurities.

7. The copper-coated steel wire according to claim 1, wherein at an interface between the core wire and the coating layer, an. alloy layer made of an alloy of a metal constituting the core wire and a metal constituting the coating layer is formed.

8. The copper-coated steel wire according to claim 1, wherein tensile strength is greater than or equal to 900 MPa and less than or equal to 3800 MPa.

9. The copper-coated steel wire according to claim 1, wherein conductivity is greater than or equal to 15% IACS and less than or equal to 80% IACS.

10. The copper-coated steel wire according to claim 1 further comprising:
   on a surface of the coating layer, a surface layer including at least one selected from a group consisting of an Au layer, an Ag layer, a Sn layer, a Pd layer, a Ni layer, and an alloy layer of these metals.

11. The copper-coated steel wire according to claim 1, wherein the thickness of the coating layer is greater than or equal to 10 μm and less than or equal to 65 μm.

12. The copper-coated steel wire according to claim 1, wherein a diameter of the core wire is greater than or equal to 0.01 mm and less than or equal to 1.0 mm.

13. A canted coil spring made of the copper-coated steel wire according to claim 1.

* * * * *